United States Patent
Tee et al.

(10) Patent No.: US 8,666,387 B2
(45) Date of Patent: Mar. 4, 2014

(54) APPARATUS AND METHOD FOR DETERMINING TRANSMIT SIGNAL PARAMETERS USING REAL-TIME CHANNEL MEASUREMENTS

(75) Inventors: Lai King Tee, Dallas, TX (US); Cornelius van Rensburg, Dallas, TX (US); Joseph R. Cleveland, Murphy, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 1956 days.

(21) Appl. No.: 11/257,515

(22) Filed: Oct. 25, 2005

(65) Prior Publication Data

US 2006/0148414 A1 Jul. 6, 2006

Related U.S. Application Data

(60) Provisional application No. 60/640,268, filed on Dec. 30, 2004.

(51) Int. Cl.
*H04W 24/00* (2009.01)

(52) U.S. Cl.
USPC ............ 455/423; 370/203; 370/208; 370/343

(58) Field of Classification Search
USPC .......................... 370/203–208, 342; 375/260; 455/423–425
See application file for complete search history.

(56) References Cited

U.S. PATENT DOCUMENTS

| | | | |
|---|---|---|---|
| 6,157,820 A * | 12/2000 | Sourour et al. ............ | 455/226.2 |
| 6,175,550 B1 | 1/2001 | van Nee | |
| 6,563,786 B1 | 5/2003 | Nee | |
| 2002/0176482 A1* | 11/2002 | Chien ........................ | 375/132 |
| 2003/0232601 A1* | 12/2003 | Uno .......................... | 455/67.11 |
| 2005/0085236 A1* | 4/2005 | Gerlach et al. ............ | 455/450 |
| 2006/0018258 A1* | 1/2006 | Teague et al. ............. | 370/236 |
| 2007/0159957 A1* | 7/2007 | Ljung et al. .............. | 370/208 |

* cited by examiner

*Primary Examiner* — Ajit Patel

(57) ABSTRACT

A method and wireless system that is able to adapt forward channel signal parameters to the different channel characteristics in each deployment environment. For example, the base station may update the waveform parameters based upon the real-time channel measurement feedback as received from the subscriber stations.

20 Claims, 6 Drawing Sheets

APPARATUS AND METHOD FOR DETERMINING TRANSMIT SIGNAL PARAMETERS USING REAL-TIME CHANNEL MEASUREMENTS

CROSS-REFERENCE TO RELATED APPLICATION AND CLAIM OF PRIORITY

The present application is related to that disclosed in U.S. Provisional Patent Application Ser. No. 60/640,268, filed Dec. 30, 2004, entitled "Apparatus And Method For Determining Transmit Signal Parameters Using Real-Time Channel Measurements". U.S. Provisional Patent Application Ser. No. 60/640,268 is assigned to the assignee of the present application. The subject matter disclosed in U.S. Provisional Patent Application Ser. No. 60/640,268 is hereby incorporated by reference into the present disclosure as if fully set forth herein. The present application hereby claims priority under 35 U.S.C. §119(e) to U.S. Provisional Patent Application Ser. No. 60/640,268.

TECHNICAL FIELD OF THE INVENTION

The present application relates generally to wireless networks and, more specifically, to an apparatus and method for determining transmit signal waveform parameters based on real-time channel measurements.

BACKGROUND OF THE INVENTION

Conventional wireless networks improve throughput by taking into consideration the characteristics of the transmission channel. Channel measurements are normally done off-line. A subsequent data analysis then determines an appropriate mathematical or statistical model that best fits the measured channel data. In conventional code division multiple access (CDMA) wireless systems (i.e., IS-95, IS-2000 and WCDMA), a pilot signal is transmitted continuously in the forward channel (or forward link) for the subscriber station to estimate the channel quality. The subscriber station then transmitted a received signal measurement value (e.g., RSSI) back to the wireless network. The measure signal data is then used to determine the necessary transmission power level or achievable data rate for the maximum transmission power.

Although a typical CDMA receiver also performs a similar search on the pilot signal for multipath components, the results of this operation are usually used for RAKE receiver implementation or pilot-weighted received signal combining. Unlike an orthogonal frequency division multiplexing (OFDM) system, a chief concern of a CDMA system regarding the delay spread is the detection and collection of energy from the multiple replicas of the transmitted data signal that arrive via various path components. In an OFDM system, the length of the guard interval or cyclic prefix is selected such that, when an OFDM symbol is transmitted, no significant amount of energy due to the channel delay spread interferes with the subsequent symbol.

Other algorithms for estimating channel parameters such as delay and magnitude of each multipath component or power delay profile are known to those of skill in the art. However, these techniques are mainly used to obtain channel measurement data that are subsequently used for off-line modeling and analysis of the channel characteristics. Other known techniques may require a design tradeoff selection of signal parameters which may not be easily changed after the system is deployed. The selected parameters may not be optimized for all the different deployment environments, nor when the channel environment changes, specifically, between the base station and the current group of users in its serving area.

In most conventional wireless systems (e.g., IEEE-802.16e and the IEEE-802.16-2004 standard, incorporated by reference), the transmit signal waveform parameters are selected when a cellular network is provisioned. The standard does not explicitly support the adaptability of changing the parameters as the channel characteristics change. On the other hand, conventional channel measurement methods are currently done to obtain data for the purpose of specifying the system design parameters. The measurements were not used as information to change signal waveform parameters in real-time.

Therefore, there is a need in the art for an improved wireless network that optimizes the forward channel signal waveform characteristics. In particular, there is a need for wireless network base stations that optimize the forward channel signal waveform characteristics according to changing forward channel conditions.

SUMMARY OF THE INVENTION

A method for determining transmit signal configuration parameters is provided. The method comprises receiving a signal in a subscriber station; determining, from the signal, a channel impulse response value between the base station and the subscriber station; estimating channel characteristics based on the channel impulse response value; and determining transmit signal configuration parameters based on the estimated channel characteristics.

A subscriber station operable in a wireless network is also provided. The subscriber station comprises a transceiver; and a processor capable of receiving a signal in a subscriber station; determining, from the signal, a channel impulse response value between the base station and the subscriber station; estimating channel characteristics based on the channel impulse response value; and determining transmit signal configuration parameters based on the estimated channel characteristics.

A base station operable in a wireless network is provided. The base station comprises a transceiver configured to transmit a first signal to a plurality of subscriber stations and to determine a channel impulse response value between a base station and at least one subscriber station. The base station also includes a controller capable of estimating channel characteristics based on the channel impulse response value, determining transmit signal configuration parameters based on the estimated channel characteristics, and modifying the transmission of the first signal in response to the transmit signal configuration parameters.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosed embodiments and their advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the invention. Those skilled in the art will understand that the principles of the present disclosure may be implemented in any suitably arranged wireless network.

The embodiments disclosed herein provide a method and wireless system that is able to adapt forward channel signal parameters to the different channel characteristics in each deployment environment. For example, the base station can update the waveform parameters based upon the real-time channel measurement feedback as received from the subscriber stations.

In a mobile cellular environment, the transmission channel between the base station or any transmitting node and receiving terminal may have very high dynamics, meaning the characteristics of the transmission channel may change rapidly. The maximum delay spread of a channel varies in a wide range depending on the specific environment, where the term "delay spread" refers to the arrival of a transmitted wireless signal at a receiver via different paths at different times. For example, the indoor environment has a relatively low delay spread compared to urban and suburban environments. In order to optimize the parameters of transmit signal waveform (e.g., size of FFT, length of cyclic prefix, tone spacing or guard interval in an OFDM-based system, the number and the location of pilot tones, and other parameters), a preferred embodiment measures the channel characteristics in real-time and determines these parameters accordingly.

Thus, a disclosed embodiment optimizes each parameter directly based on channel conditions, thereby providing superior performance. In particular, a preferred embodiment introduces the technique of adapting OFDM signal waveform parameters, such as FFT size, length of cyclic prefix or guard intervals, tone spacing, the number and the location of pilot tones within the channel, coding method, quadrature amplitude modulation constellation size, and/or other parameters based on real-time channel measurements.

Figure 1:
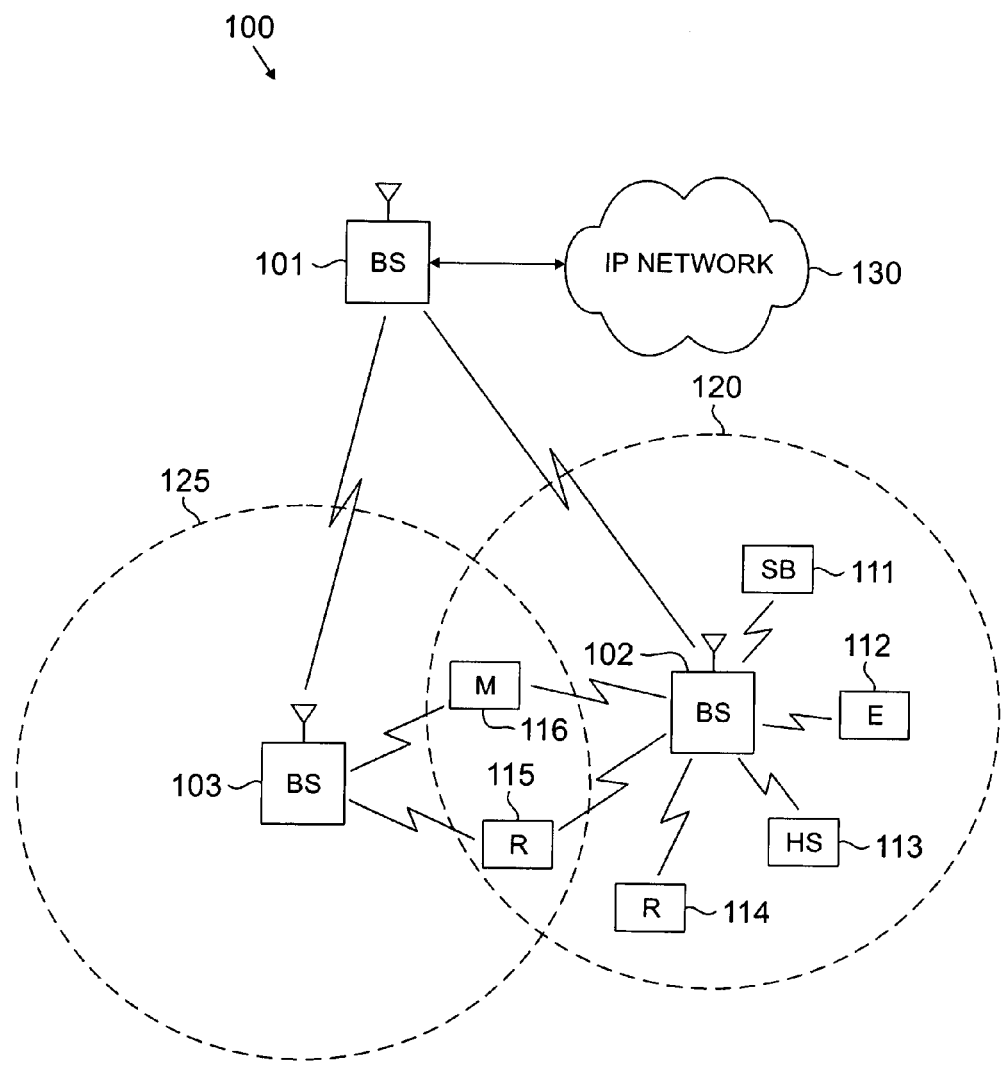
FIG. 1 illustrates an exemplary wireless network that adapts forward channel signal parameters to the different channel characteristics according to the principles of the disclosure.

FIG. 1 illustrates exemplary wireless network 100, which adapts forward channel signal parameters to different channel characteristics according to the principles of the present invention. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. Alternatively, base station 103 may be connected directly to the Internet through a wired broadband connection, such as an optical fiber, DSL, cable or T1/E1 line.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network (PSTN) gateway for voice-based communications. It is noted that in the case of voice-based communications in the form of voice over IP (VoIP), the traffic will be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

Figure 2:
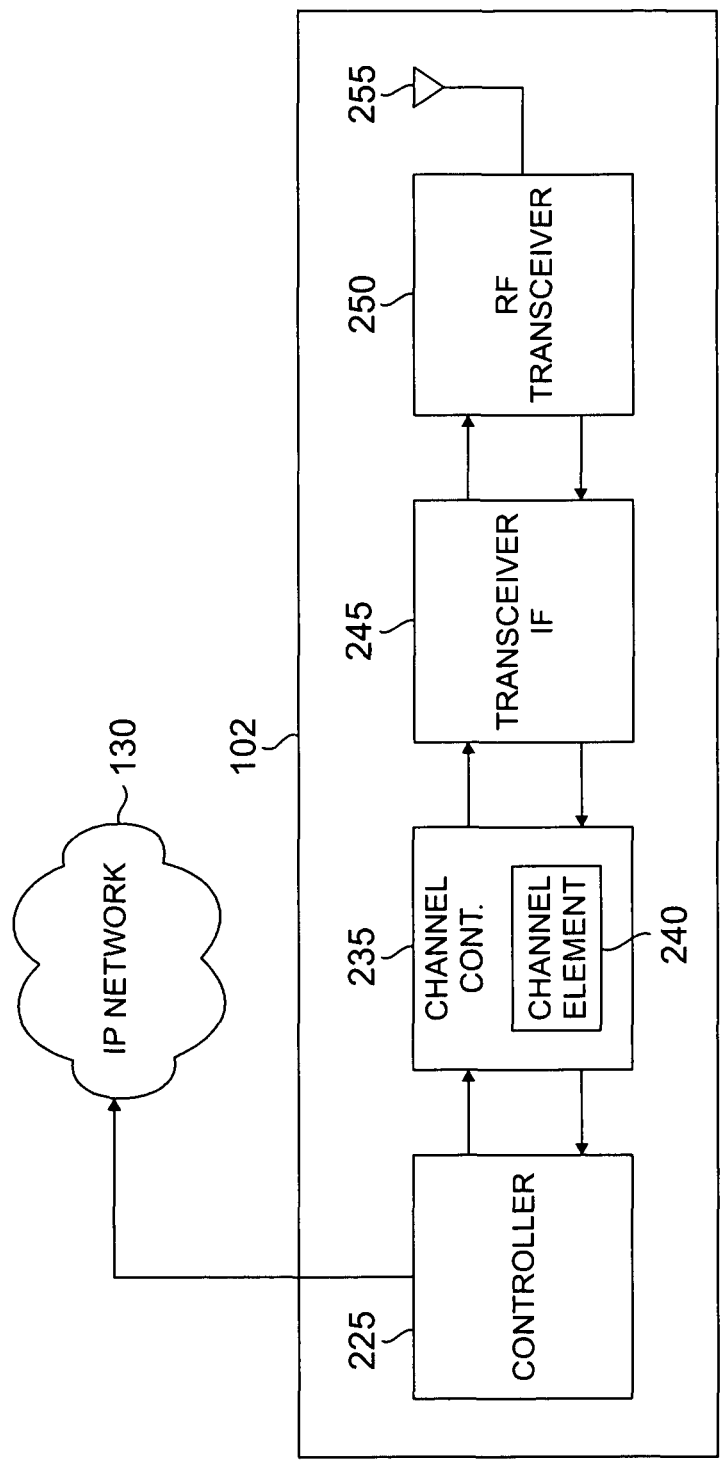
FIG. 2 illustrates an exemplary base station in greater detail according to an embodiment of the disclosure.

FIG. 2 illustrates exemplary base station 102 in greater detail according to one embodiment of present disclosure. Base station 102 is illustrated by way of example only. However, it will be understood that the components illustrated and described with respect to base station 102 are also part of base stations 101 and 103. In one embodiment, base station 102 comprises controller 225, channel controller 235, transceiver interface (IF) 245, radio frequency (RF) transceiver unit 250, and antenna array 255.

Controller 225 comprises processing circuitry and memory capable of executing an operating program that controls the overall operation of base station 102. In an embodiment, the controller 225 may be operable to communicate with the network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correction operations, as known to those of skill in the art. Transceiver IF 245 transfers bidirectional channel signals between channel controller 235 and RF transceiver unit 250.

Antenna array 255 transmits forward channel signals received from RF transceiver unit 250 to subscriber stations 111-116 in the coverage area of base station 102. Antenna array 255 is also operable to send to RF transceiver unit 250 reverse channel signals received from subscriber stations 111-116 in the coverage area of the base station 102. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

Figure 3:
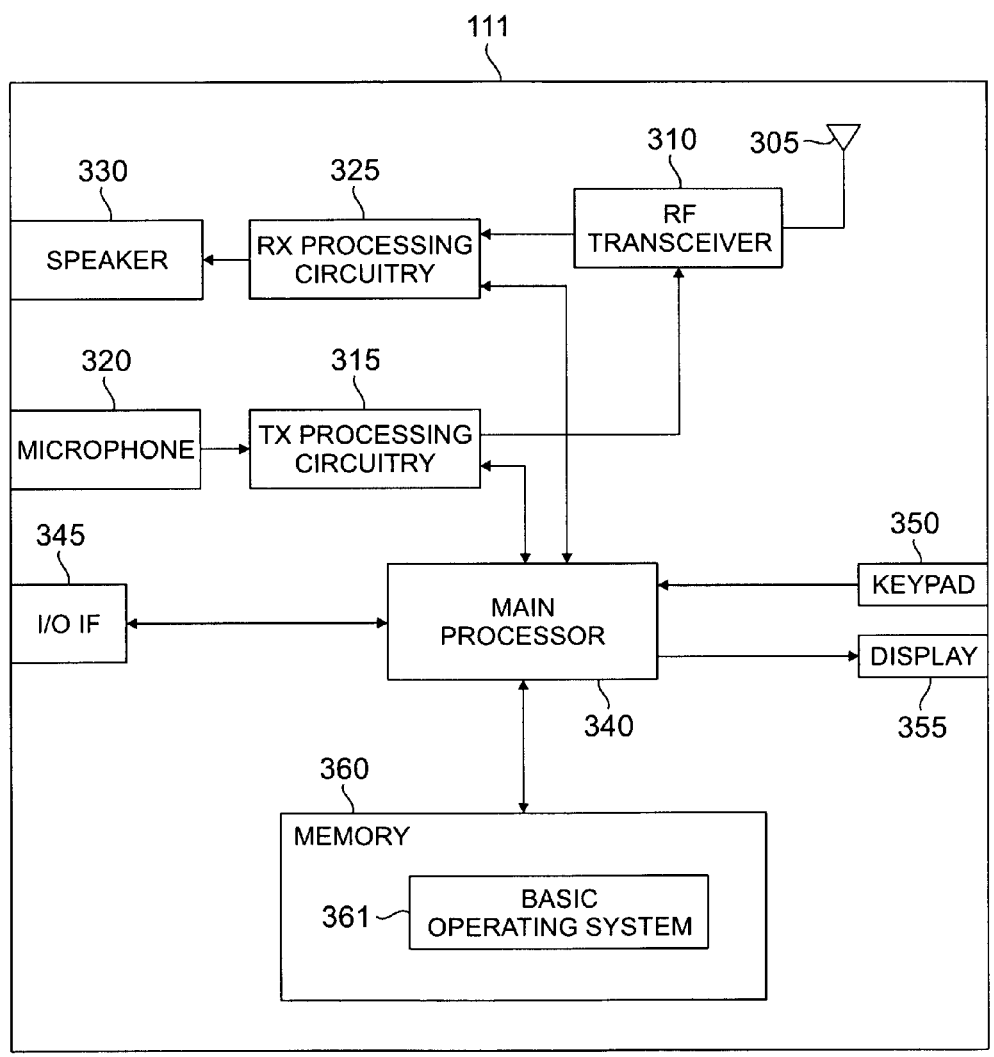
FIG. 3 illustrates a wireless subscriber station according to an embodiment of the present disclosure.

FIG. 3 illustrates wireless subscriber station 111 according to an advantageous embodiment of the present disclosure. Wireless subscriber station 111 comprises antenna 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, and memory 360. Memory 360 further comprises basic operating system (OS) program 361.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing). It is noted that the microphone and speaker may be connected externally to the subscriber station when the form factor of the latter is a PC card, such as a PCMCIA card.

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In an advantageous embodiment of the present disclosure, main processor 340 is a microprocessor or microcontroller. Memory 360 is coupled to main processor 340. According to an advantageous embodiment of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 111. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. Main processor 340 is also coupled to I/O interface 345. I/O interface 345 provides subscriber station 111 with the ability to connect to other devices such as laptop computers and handheld computers. I/O interface 345 is the communication path between these accessories and main processor 340.

Main processor 340 is also coupled to keypad 350 and display unit 355. The operator of subscriber station 111 uses keypad 350 to enter data into subscriber station 111. Display 355 may be a liquid crystal display capable of rendering text and/or at least limited graphics from web sites. Alternate embodiments may use other types of displays. When the subscriber station has a form factor of a PC card, the keypad and display unit are external to the PC card.

According to the principles of the present disclosure, each of base stations 101-103, or one as described with respect to FIG. 2, is capable of adapting forward channel signal parameters in real-time to a changing channel using data characterizing the channel. Preferably, at least one base station includes a controller capable of analyzing configuration parameters received from at least one subscriber station, and modifying the transmission of the forward channel signal in response to at least one of the configuration parameters. A subscriber station as described with respect to FIG. 3 can be modified to obtain the data characterizing the channel and to provide the data in real-time to the base stations 101-103. The present disclosure is particularly suited to a wideband system that uses OFDM transmission techniques, although other transmission protocols (e.g., CDMA) may be used. The present disclosure enhances the provisioning, adaptation and optimization of wireless network 100 to the time-varying channel environment. In the case of a mobile ad hoc network (MANET), an optimized communication signal waveform may be determined by one of the MANET nodes based on real-time data characterizing the channel between the transmitting and receiving MANET nodes. A MANET is a communication network spontaneously established between two or more subscriber stations.

Figure 4:
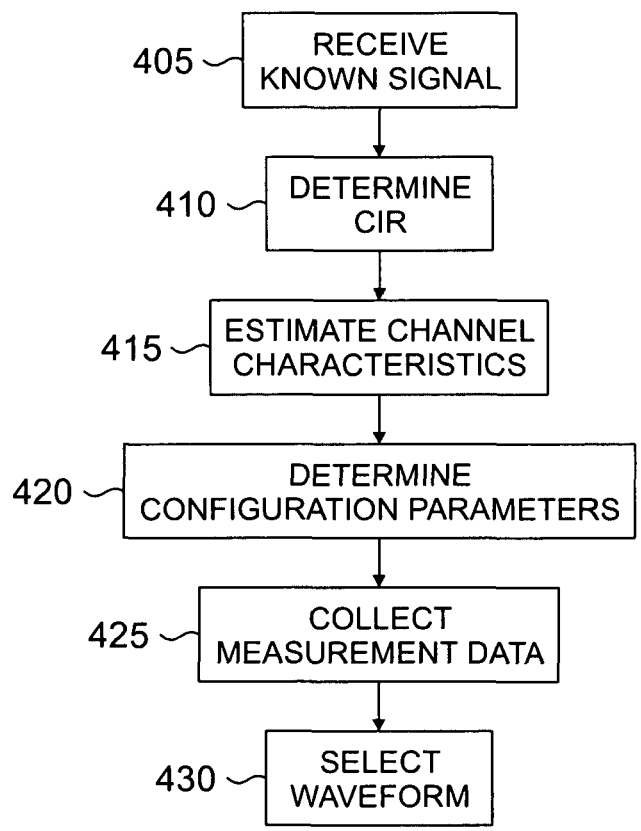
FIG. 4 depicts a flowchart of a process in accordance with an embodiment of the disclosure.

FIG. 4 depicts a flowchart of a process in accordance with an exemplary embodiment of the present disclosure. First, a wideband signal which is known to the receiver, for example a pre-determined wideband pseudo-random noise signal, is transmitted from any transmitter (e.g., a base station) and received by a subscriber station (step 405). Each of the other communicating subscriber stations, or at least one of them, performs correlation detection or matched filtering of the known received signal to determine the channel impulse response (CIR) in the forward link (i.e., from the BS to the MS) (step 410). As is known to one skilled in the art, the CIR characterizes the channel between a transmitter and a receiver. In a mobile ad hoc network (MANET), the first transmitter may be any of the MANET nodes or subscriber stations communicating with each other.

Using the measured CIR value, the subscriber station and/or the base station estimates the channel characteristics, preferably including delay spread, the power delay profile, and the frequency selectivity of the channel (step 415). Frequency selectivity refers the signal being attenuated, reduced in power, or muffled more at some frequencies than at others. A channel in which the signal is attenuated by the same amount at all frequencies has low frequency selectivity, or is described as flat fading. In a simple example, a channel in which the signal is attenuated very little at a first frequency and is attenuated very much at a second frequency has high frequency selectivity.

Having estimated the channel characteristics, the subscriber station and the base station then determine the appropriate guard time (cyclic prefix length) and other configuration parameters (step 420), such as sub-channelization, the optimal allocations of subcarriers and subchannels in an OFDM system, the subcarrier spacing, the determination of the number and the location of pilot tones within the channel, the coding method, the quadrature amplitude modulation (QAM) constellation size, and other parameters. The guard time is selected to promote separation between transmitted symbols in a multi-path channel and is based on a determination of the delay spread.

In a centralized infrastructure (i.e., OFDMA or CDMA based cellular networks), a base station collects all of the channel characterization data from all of the subscriber stations that are in communication with the base station (step 425). Based on the channel characterization data, the optimum waveform may be selected or re-selected based on the dynamics of the various BS to MS channels (step 430).

For example, based on the description of the channel characterization data measurement described in Method 2 below, when $i_k'$ is the maximum delay spread sample estimated for the channel, the cyclic prefix or guard interval period may be set to the maximum delay spread value to avoid inter-symbol interference. If $T_s$ is the sample time, the length of cyclic prefix can be set to the following:

$$T_{CP} = T_S \cdot i'_k. \quad \text{[Eqn. 1]}$$

Because the maximum delay spread may vary significantly between the different channel environments, these parameters may be selected to reduce the overhead caused by the cyclic prefix while optimizing the spectral efficiency.

The base station may also perform a Fast Fourier Transform (FFT) on a time domain representation of the CIR provided by the subscriber station to determine the frequency response of the channel. This enables the base station to schedule subscriber stations for each subcarrier or groups of subcarriers (subchannels) in order to maximize the throughput and the spectral efficiency of the cell site.

Another important characteristic for OFDM signaling is the division of a wide bandwidth into narrower, orthogonal subcarriers (subchannels) so that, within each subcarrier, the channel is approximately flat fading instead of frequency-selective fading. Under flat fading channel conditions a simple single-tap equalizer may be used to equalize the received signal and achieve optimum performance rather than a more complicated equalizer circuit, thereby simplifying the receiver design. The frequency selectivity of the channel may be obtained through the real-time channel measurement data. Based on this information, the appropriate number of subcarriers and the size of the FFT may be determined in order to ensure that the subcarrier channels are not frequency selective. The determination of the number and the location of pilot tones within the channel may also be based on this information.

The CIR can be employed by the base station to determine coding methods and QAM constellation size. For example, in a poor channel subject to a high bit error rate at a reference data rate, the base station may determine to employ a stronger code. Alternatively, in a poor channel subject to a high bit error rate at the reference data rate, the base station may determine to employ a smaller QAM constellation size wherein the different QAM values are more readily distinguished from each other.

Furthermore, the methods of the present disclosure may be extended to the selection of parameters based on an estimation of interference. For example, if the subscriber station receiver reports a high interference level at the frequencies near the channel edges, more guard tones may be allocated to avoid interference at the channel edges. Otherwise, a smaller number of guard tones may be used to reduce the overhead and to allow higher spectral efficiency.

The present disclosure can use a number of different methods to determine the channel power delay profile. Two exemplary methods are explained below.

Figure 5:
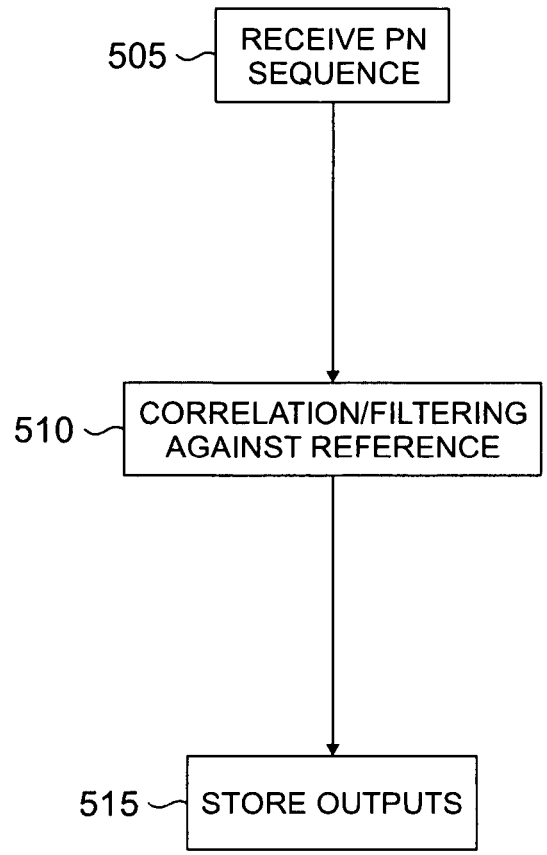
FIG. 5 illustrates a method for determining a channel power delay profile in accordance with an embodiment of the disclosure.

Method 1—FIG. 5 illustrates a method for determining a channel power delay profile in accordance with an exemplary embodiment of the present disclosure. Here, first, a pre-determined pseudo-random noise (PN) sequence (e.g., as the preamble of a frame or a superframe) is transmitted by the base station, and received by the subscriber station, at regular intervals at a chip rate that fits into the entire available system bandwidth (step 505).

Next, using a locally generated reference based on the same PN sequence, the subscriber station can perform correlation or matched filtering with the received signal (step 510). This correlation can be done either serially or in parallel, depending on the number of correlators (or matched filters) that are available at the receiver. The correlation detection may be done with the local reference signal delayed by a fraction of a chip at each time. If the output values are greater than a certain threshold, some of these correlator outputs or matched filter outputs may be stored (step 515).

Figure 6:
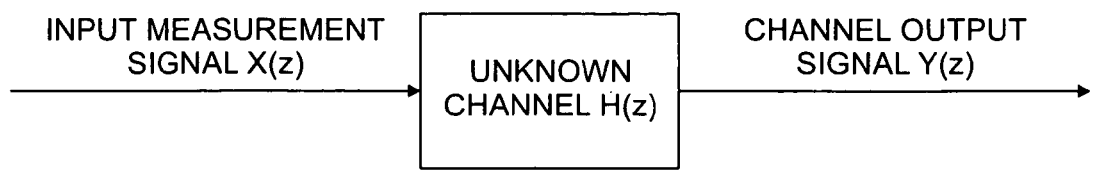
FIG. 6 illustrates a general system model for the identification of the characteristics of an unknown channel.

Method 2—FIG. 6 illustrates a general system model for the identification of the characteristics of an unknown channel. This model is expressed by Equation 2 below. Equation 2 is shown in the Z-domain, which is also applicable to the frequency domain.

Figure 7:
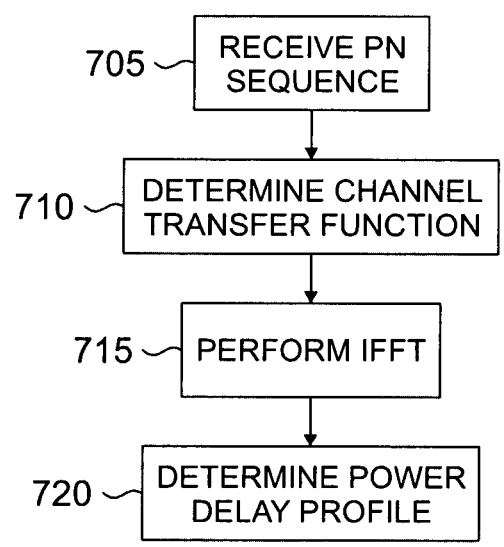
FIG. 7 depicts a flowchart of a process in accordance with an exemplary embodiment of the present disclosure.

FIG. 7 depicts a flowchart of a process in accordance with an exemplary embodiment of the present disclosure as described with relation to method 2. After the channel measurement is performed in the frequency domain, the CIR can be derived by an Inverse Fast Fourier Transform (IFFT) operation. Thus, both the frequency selectivity and the power delay profile of the channel may be identified.

The channel and delay characteristics may be estimated as follows:

$$H(z) = \frac{Y(z)}{X(z)} \quad \text{[Eqn. 2]}$$

Here, X(z) is the input measurement signal and Y(z) is the channel output signal. Thus, when the value of X(z) is known, the value of H(z) may be determined at the receiver, where H(z) is the discrete channel transfer function and corresponds to the frequency domain representation of the discrete impulse response h(i). This can be done easily when the input measurement signal is a wideband pseudo-noise signal. Alternatively, pre-determined symbols may be loaded onto a number of subcarriers for transmission after an IFFT operation is performed.

The PN sequence is transmitted at regular intervals from a transmitter such as the base station. When a subscriber station (MS) receiver acquires the PN sequence (step 705), the channel transfer function is determined according to Equation 2 (step 710). After an IFFT is performed on the channel frequency response (step 715), the MS receiver determines the power delay profile (step 720) which is identical with the time domain impulse response of the channel. The maximum delay spread may be determined from the time domain impulse response as the length of time for the time domain impulse response to decay below a level that is insignificant.

It is noted that the time domain impulse response is substantially defined by the multi-path components of the channel. The method of determining the maximum delay spread is specified as follows. First, the receiver searches for the maximum path gain $|h(i_0)|$ and the corresponding path delay $i_0$, where $i_0\{0, 1, 2, \ldots, N-1\}$ is one of the time-domain samples in the computation in Equation 2 (i.e., after the IFFT is performed). Next, the receiver searches for the second largest path gain $|h(i_1)|$ and the corresponding path delay $i_1$, where $i_1$ is $\{i_1 \neq i_0 | 0, 1, 2, \ldots, N-1\}$. This step is repeated until:

$$\frac{|h(i_{K+1})|}{|h(i_0)|} < Th \quad \text{[Eqn. 3]}$$

for the (K+1)th path and some threshold values (e.g., Th=0.01). The results of this channel delay spread estimation may be communicated to the base station transmitter for a selection of appropriate waveform parameters (e.g., guard interval, length of cyclic prefix required).

In some conventional networks, the preamble is used to estimate some parameters, such as time of arrival (TOA) and frequency errors as in IEEE-802.16-2004 standard. In the algorithm described above, additional information about the channel delay profile (i.e., the delays and relative power of the multipath components) is also determined. The information is then used by the transmitter to determine the optimum waveform parameters to be used.

In case of a TDD system, the channel measurement for the forward link may also be done at the base station based on a predetermined PN sequence transmitted from the subscriber station. In another case, the subscriber station may determine the appropriate or desirable waveform parameters, such as length of guard interval, FFT size, subcarrier spacing, sub-channel size (or coherent bandwidth) and number of guard tones and send this information to the BS instead of the CIR.

In an environment having relatively slow variation in the channel variation, for example in a mobile cellular system with a fixed base station transmitter, communicating with a number of stationary or low-mobility subscriber stations, the parameters may not benefit from refreshing more often than a few times per day. However, in a mobile ad hoc network, the parameters are desirably selected at the time when the ad hoc network is created. As new links and new nodes are formed, the parameters may be updated more often. Furthermore, it is possible to use a set of parameters for a group of users and another set for a different group. For example, the same parameters are used for the group of users who are receiving transmission simultaneously within the same time period.

In other embodiments, the base station receives the measured CIR value back from one or more subscriber stations.

The base station then can estimate channel characteristics based on the CIR value, determine transmit signal configuration parameters based on the estimated channel characteristics, and modify the transmission of the first signal in response to the transmit signal configuration parameters. This can all be done in real time, using any of the methods described above.

Although the present disclosure has been described with exemplary embodiments, various changes and modifications may be suggested to one skilled in the art. It is intended that the present invention encompass such changes and modifications as fall within the scope of the appended claims.

What is claimed is:

1. A method for determining transmit signal configuration parameters comprising:
   receiving a signal in a subscriber station;
   determining, from the signal, a channel impulse response value between a base station and the subscriber station;
   estimating channel characteristics based on the channel impulse response value; and
   determining two or more transmit signal waveform configuration parameters based on the estimated channel characteristics, the two or more transmit signal waveform configuration parameters selected from the group consisting of sub-channelization, number and allocations of subcarriers and subchannels, subcarrier spacing, guard interval, guard time length, a number of pilot tones, a location of pilot tones, a coding method, and a quadrature amplitude modulation constellation size.

2. The method of claim 1, further comprising sending the channel characteristics to a base station.

3. The method of claim 1, wherein the channel characteristics are selected from the group consisting of a delay spread, a power delay profile, and a frequency selectivity.

4. The method of claim 1, wherein the signal received in the subscriber station is known pseudo-random noise signal.

5. The method of claim 1, wherein the signal is received from a source selected from the group consisting of another subscriber station and a base station.

6. The method of claim 1, wherein the channel characteristics are estimated by comparing a channel output signal and a input measurement signal.

7. The method of claim 1, wherein the channel characteristics include a maximum channel delay spread determined according to at least one measurement of a path gain and delay of the received signal.

8. A subscriber station operable in a wireless network, comprising:
   a transceiver configured to receive a signal; and
   a processor configured to:
      determine, from the signal, a channel impulse response value between a base station and the subscriber station,
      estimate channel characteristics based on the channel impulse response value, and
      determine two or more transmit signal waveform configuration parameters based on the estimated channel characteristics, the two or more transmit signal waveform configuration parameters selected from the group consisting of sub-channelization, number and allocations of subcarriers and subchannels, subcarrier spacing, guard interval, guard time length, a number of pilot tones, a location of pilot tones, a coding method, and a quadrature amplitude modulation constellation size.

9. The subscriber station of claim 8, wherein the subscriber station is configured to send the channel characteristics to a base station.

10. The subscriber station of claim 8, wherein the channel characteristics are selected from the group consisting of a delay spread, a power delay profile, and a frequency selectivity.

11. The subscriber station of claim 8, wherein the signal received in the subscriber station is known pseudo-random noise signal.

12. The subscriber station of claim 8, wherein the signal is received from a source selected from the group consisting of another subscriber station and a base station.

13. The subscriber station of claim 8, wherein the channel characteristics are estimated by comparing a channel output signal and a input measurement signal.

14. The subscriber station of claim 8, wherein the channel characteristics include a maximum channel delay spread determined according to at least one measurement of a path gain and delay of the received signal.

15. A base station operable in a wireless network, comprising:
   a transceiver configured to transmit a first signal to a plurality of subscriber stations, and receive at least one of channel characteristics from a plurality of subscriber stations; and
   a controller configured to:
      determine at least two configuration parameters based on the at least one of the channel characteristics received from all of the plurality of subscriber stations, the at least two configuration parameters selected from the group consisting of sub-channelization, number and allocations of subcarriers and subchannels, subcarrier spacing, guard interval, a guard time length, a number of pilot tones, a location of pilot tones, a coding method, and a quadrature amplitude modulation constellation size, and
      modify the transmission of the first signal waveform based on the at least two configuration parameters and the at least one of the channel characteristics received from the plurality of subscriber stations.

16. The base station of claim 15, wherein the at least one of the channel characteristics is selected from the group consisting of a delay spread, a power delay profile, and a frequency selectivity.

17. The base station of claim 15, wherein the base station modifies the transmission of the first signal in a real-time response to receiving the at least one of the channel characteristics.

18. A base station operable in a wireless network, comprising:
   a transceiver configured to transmit a first signal to a plurality of subscriber stations and receive at least one of channel characteristics from at least one subscriber station; and
   a controller configured to:
      determine a channel impulse response value between the base station and the at least one subscriber station;
      estimate channel characteristics based on the channel impulse response value,
      determine two or more transmit signal configuration waveform parameters based on the estimated channel characteristics, the two or more transmit signal configuration parameters selected from the group consisting of sub-channelization, number and allocations of subcarriers and subchannels, subcarrier spacing, guard interval, a guard time length, a number of pilot tones, a location of pilot tones, a coding method, and a quadrature amplitude modulation constellation size, and modify the transmission of the first signal in response to the two or more transmit signal configuration parameters.

19. The base station of claim 18, wherein the controller is further configured to estimate channel characteristics and determine the two or more transmit signal configuration waveform parameters in real time.

20. The base station of claim 18, wherein the channel characteristics comprise a delay spread, a power delay profile, and a frequency selectivity.

* * * * *